United States Patent
Foglar

[11] Patent Number: 5,907,536
[45] Date of Patent: May 25, 1999

[54] APPARATUS AND METHOD FOR COMMUNICATION BETWEEN SENDING AND/OR RECEIVING STATIONS AND A TRANSFER STATION

[75] Inventor: Andreas Foglar, München, Germany

[73] Assignee: Siemens Aktiengesellschaft, Munich, Germany

[21] Appl. No.: 08/764,710

[22] Filed: Dec. 2, 1996

[30] Foreign Application Priority Data

Dec. 1, 1995 [DE] Germany .................... 195 44 976

[51] Int. Cl.⁶ ............................................. H04L 12/54
[52] U.S. Cl. ................... 370/230; 370/395; 370/428
[58] Field of Search ........................... 370/229, 230, 370/231, 232, 235, 389, 395, 396, 397, 400, 401, 412, 415, 428, 429; 395/200.6, 200.62, 200.63, 200.64, 200.65

[56] References Cited

U.S. PATENT DOCUMENTS

| | | | |
|---|---|---|---|
| 5,313,454 | 5/1994 | Bustini et al. | 370/231 |
| 5,377,327 | 12/1994 | Jain et al. | 370/229 |
| 5,530,806 | 6/1996 | Condon et al. | 370/397 |
| 5,568,470 | 10/1996 | Ben-Nun et al. | 370/412 |
| 5,659,758 | 8/1997 | Gentry et al. | 395/733 |
| 5,719,853 | 2/1998 | Ikeda | 370/229 |

OTHER PUBLICATIONS

"Aspects of ATM–Mediations" (Habermann et al.), Telecommunications Engineer, Mar. 1992, magazine for education and further instruction, pp. 1–31.

*Primary Examiner*—Alpus H. Hsu
*Attorney, Agent, or Firm*—Herbert L. Lerner; Laurence A. Greenberg

[57] ABSTRACT

In an apparatus and a method for communication between sending and/or receiving stations and a transfer station, data that are supplied from the sending stations to the transfer station are intended to be carried to receiving stations. The transfer station takes over the data supplied to it and carries the data directly or indirectly to a particular desired receiving station. A quantity of data taken over and/or to be taken over into the transfer station is determined, and the takeover of data from one or more sending stations to the transfer station can be interrupted selectively as a function of the result of determination.

26 Claims, 1 Drawing Sheet

APPARATUS AND METHOD FOR COMMUNICATION BETWEEN SENDING AND/OR RECEIVING STATIONS AND A TRANSFER STATION

BACKGROUND OF THE INVENTION

1. Field of the Invention

The present invention relates to an apparatus and a method for communication between sending and/or receiving stations and a transfer station, wherein the sending stations supply the transfer station with data intended to be carried further to the receiving stations, and the transfer station takes over the data supplied to it and carries the data directly or indirectly to the particular desired receiving station.

Such known apparatuses and methods will be described briefly below by taking the ATM method as an example.

As early as May 1990, the CCITT (Consultative Committee for International Telephony and Telegraphy) made the ATM (asynchronous transfer mode) the standard for so-called data packet transfer in the B-ISDN. ATM was defined as follows: "A transfer method in which the information is bundled in cells; the method is asynchronous in the sense that the cells need not necessarily be exchanged periodically between the sender and the receiver."

According to one possible embodiment for performing the ATM method which is shown in FIG. 2 and described below, a transfer station in the form of a so-called ATM layer circuit, and a plurality of sending stations in the form of so-called PHY layer circuits, are provided. The plurality of sending stations are connected to the one transfer station and transmit asynchronous data packets (cells) to it, which are intended for further conduction or transfer to receiving stations.

The transfer station has a maximum data throughput that cannot be exceeded. Consequently, the sending stations must in principle be constructed in such a way that, or only so many sending stations can be connected to a transfer station so that, the sum of data quantities transmitted per unit of time to the transfer station does not exceed the maximum throughput of the transfer station. However, in some sending stations, the quantity of data to be transmitted per unit of time to the transfer station can vary sharply, for instance if the sending station is a terminal or the like, or if the sending station is connected to such a device.

If in such a case the basis for the layout and/or adjustment of the system is made to be the maximum possible quantity of data that can be transmitted in an extreme case from the particular sending station to the transfer station, then as a rule only extremely seldom is the transfer station appropriately utilized. In most cases, it is instead operated far below its performance limit. The procurement and operation of such a system would therefore be relatively expensive.

On the other hand, if the basis for the layout and/or adjustment of the system, to increase economy, is not the maximum amount of data transmissible from the particular sending station to the transfer station but rather only a lesser quantity of data, such as the average amount of data to be transmitted, then it can happen that the transfer station is supplied with more data per unit of time than it can pass on. As a consequence, data sent to the transfer station can be lost. Under some circumstances, operating a system constructed in that way would thus involve a not inconsiderable risk to security or safety.

None of the aforementioned options is satisfactory.

SUMMARY OF THE INVENTION

It is accordingly an object of the invention to provide an apparatus and a method for communication between sending and/or receiving stations and a transfer station, which overcome the hereinafore-mentioned disadvantages of the heretofore-known devices and methods of this general type in such a way that in the transfer station, a durably high actual data throughput is attainable and security risks from overloads of the transfer station can be precluded.

With the foregoing and other objects in view there is provided, in accordance with the invention, in an assembly having sending stations, receiving stations, and a transfer station receiving data from the sending stations intended to be carried further to the receiving stations, the transfer station taking over the data supplied to it and carrying the data directly or indirectly to a particular desired receiving station, the improvement comprising an apparatus for communication between at least one of the sending and receiving stations and the transfer station, comprising a determining device for determining a quantity of data taken over and/or to be taken over into the transfer station per unit of time; and an interruption device for selectively interrupting the takeover of data from at least one of the sending stations to the transfer station as a function of a determination result.

With the objects of the invention in view there is also provided, in a method for communication between at least one of sending and receiving stations and a transfer station, which includes supplying data from the sending stations to the transfer station with an intention to carry the data further to the receiving stations, taking over the received data in the transfer station and carrying the data directly or indirectly to a particular desired receiving station, the improvement which comprises determining a quantity of data taken over and/or to be taken over into the transfer station per unit of time; and selectively interrupting the takeover of data from at least one of the sending stations to the transfer station as a function of a determination result.

Accordingly, in the apparatus it is provided that a determining device, through the use of which a quantity of data taken over and/or to be taken over into the transfer station per unit of time can be calculated, and an interruption device, through the use of which the takeover of data from one or more sending stations to the transfer station can be interrupted selectively as a function of the result of determination, are provided, and in the method a quantity of data taken over and/or to be taken over into the transfer station per unit of time can be calculated, and the takeover of data from one or more sending stations to the transfer station can be interrupted selectively as a function of the result of the determination.

Through the use of these measures, an incipient overload on the transfer station can be detected early and thereupon the takeover of data from selected sending stations to the transfer station can be interrupted purposefully.

The purposeful interruption of the data takeover makes it possible to limit the interruption to a minimum number of sending stations and/or to those sending stations having a failure with the least negative effects.

In contrast to the conventional transfer method, it is not all of the sending stations that are involved in the event of an overload or incipient overload of the transfer station (referred to below as a critical state for the sake of simplicity; the spillover of the input buffer of the transfer station that has occurred until now in such situations typically affected all of the data of all of the sending stations), but only some or a few sending stations (because an overflow of the input buffer of the transfer station can no longer occur, if the data supplied to the transfer station is selectively interrupted in good time). Since the sending station or sending stations affected by the interruption are known, the possibly occurring data losses during the critical state can be appropriately considered in the further processing of the data, and/or when the state is normalized they can be rapidly and simply eliminated by making another attempt at transmission.

The continuous determination of the data quantities taken over to the transfer station per unit of time makes it possible to terminate the aforementioned interruption immediately in response to a correspondingly sharp drop in the data flow and to take the ignored sending station or sending stations normally into account once again.

Since such a mechanism to guard against an overload of the transfer station is provided, the layout and/or adjustment of the configuration need not be directed to the maximum transmissible quantity of data per unit of time. Instead, the consumption can be average conditions, and thus substantially better utilization of the transfer station is attainable.

An apparatus and a method are thus created through the use of which a durably high actual data throughput in the transfer station is attainable, and security or safety risks from overloads of the transfer station can be precluded.

In accordance with another feature of the invention, the communication from the sending stations to the transfer station is an asynchronous data packet transmission.

In accordance with still another mode of the invention, there is provided a method which comprises separately determining the data quantity taken over and/or to be taken over from the associated sending station per unit of time.

In accordance with a further feature of the invention, the transfer station performs an ATM transfer method.

In accordance with an added feature of the invention, the determining device has a multiplicity of sub-determining devices each assigned to a respective one of the sending stations and each separately determining the data quantity taken over and/or to be taken over from the associated sending station per unit of time.

In accordance with an additional feature of the invention, the determining device compares the determined data quantities in each case with a limit value fixed for the applicable sending station.

In accordance with yet another feature of the invention, the determining device compares a sum of data quantities determined for all of the sending stations with a total limit value fixed for the transfer station.

In accordance with yet a further feature of the invention, the determining device determines the total data quantity taken over and/or to be taken over by the transfer station from all of the sending stations per unit of time.

In accordance with yet an added feature of the invention, the determining device compares the determined total data quantity with a total limit value defined for the transfer station.

In accordance with yet an additional feature of the invention, the determining device causes the interruption device to interrupt data takeover if it is found in the comparison that the applicable limit value has been exceeded.

In accordance with again another feature of the invention, there is provided a query device for continuously conducting queries among the sending stations that are not to be uncoupled from one another, to determine whether and optionally where data packets are available for takeover to the transfer station.

Other features which are considered as characteristic for the invention are set forth in the appended claims.

Although the invention is illustrated and described herein as embodied in an apparatus and a method for communication between sending and/or receiving stations and a transfer station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
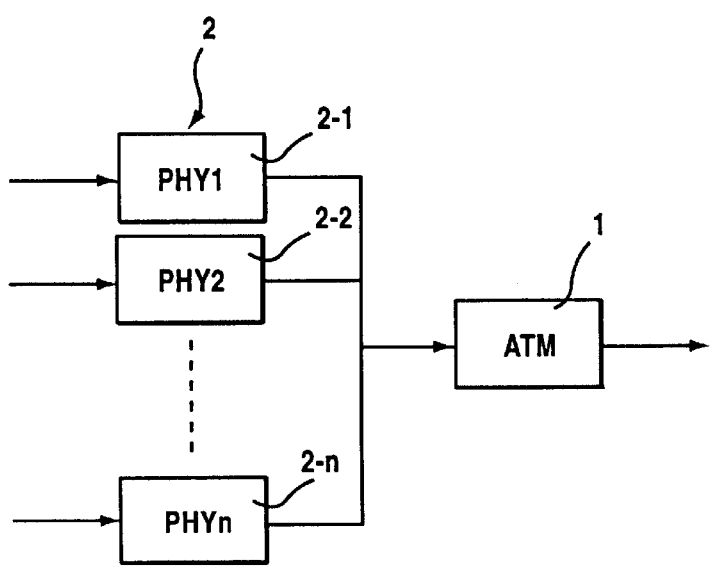
FIG. 2 is a block circuit diagram showing a layout of a conventional ATM transfer system.

Referring now to the figures of the drawings in detail and first, particularly, to FIG. 2 thereof, there is seen a possible conventional embodiment for performing the ATM (asynchronous transfer mode) method.

A transfer station 1 in the form of a so-called ATM layer circuit, and a plurality of sending stations 2-1, 2-2, . . . , 2-n in the form of so-called PHY layer circuits, are provided in FIG. 2.

The plurality of sending stations 2-1, 2-2, . . . , 2-n are connected to the one transfer station 1 and transmit asynchronous data packets (cells) to it, which are intended for further conduction or transfer to non-illustrated receiving stations. Further details concerning the ATM method and the operation thereof are explained above.

As in the conventional system of FIG. 2 which was already described above, the system shown in FIG. 1 likewise pertains to an apparatus for performing the ATM transfer method.

Figure 1:
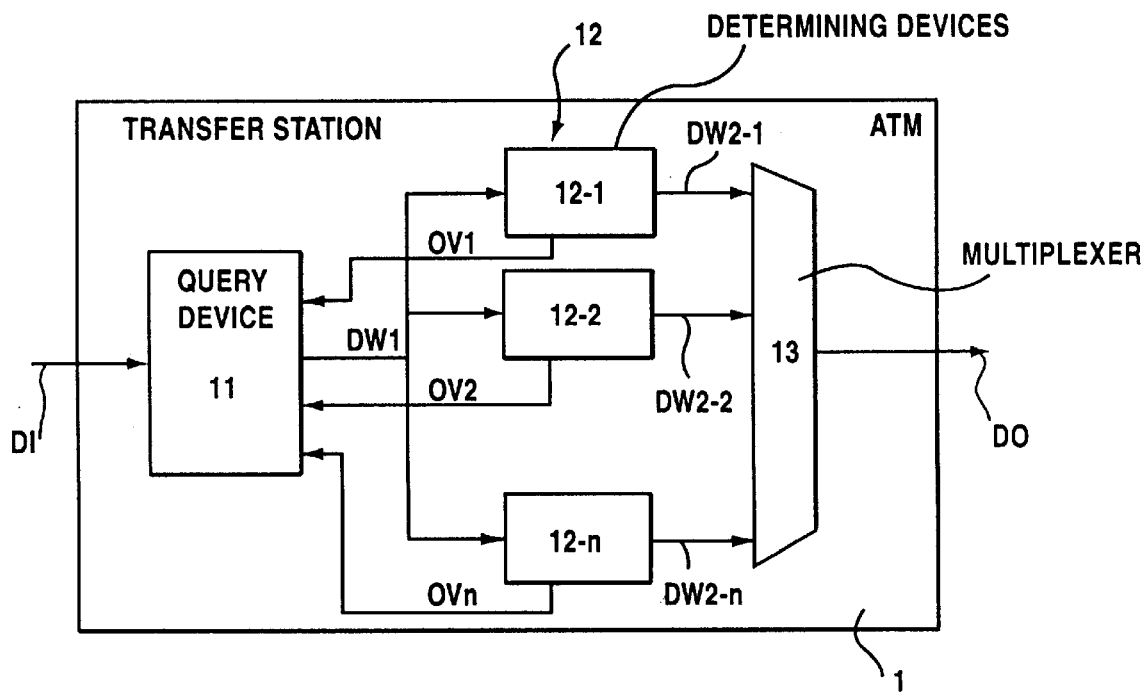
FIG. 1 is a block circuit diagram of a layout of an ATM transfer system containing an apparatus according to the invention.

As in FIG. 2, in the system shown in FIG. 1 many non-illustrated sending stations are provided in the form of PHY layer circuits. Each of these sending stations is connected through a separate data transmission line to a common transfer station 1 in the form of an ATM layer circuit. In FIG. 1, only a single data transmission line DI is shown, to represent the many data transmission lines mentioned.

The transfer station 1 contains a query device 11, a determining device 12 and a multiplexer 13.

The query device 11 is connected to the sending stations, as well as to the determining device 12, through the many data transmission lines DI.

The task of the query device 11 is to cyclically, or in some other arbitrary order, query the sending stations connected to it through the data transmission lines DI and to cause them as needed to send data packets (cells) to be transferred by the transfer station 1, to the transfer station. During the transmission of a data packet from one of the sending stations to the transfer station and/or during the takeover of it in the transfer station, or more specifically in the query device 11, the query device 11 continues the scanning of the sending stations or data transmission lines DI, in order to subsequently determine data packets to be transmitted from the sending stations and/or taken over in the transfer station.

The data packets which are sent by the sending stations and taken over by the query device 11 are carried on by the query device to the determining device 12.

The determining device 12 is composed of a large number of sub-determining devices 12-1, 12-2, . . . , 12-n that corresponds in number to the number of sending stations.

Each sub-determining device 12-1, 12-2, . . . , 12-n is assigned to a certain sending station (which if needed may also be composed of a group of sub-sending stations).

The task of each sub-determining device 12-1, 12-2, . . . , 12-n is to determine the data quantity that the transfer station 1 has taken over and/or is to take over per unit of time from the sending station associated with the particular sub-determining device.

The task of the determining device or sub-determining devices 12-1, 12-2, . . . , 12-n is also to cause the query device 11, as needed, to selectively leave out one or more of the sending stations in the query. As a result, data transmission from the affected sending station to the transfer station is prevented, and consequently the determining device in cooperation with the query device acts as a (data takeover) interrupting device. The events that trip the described influence on the query device, and possible variants of the way in which influence is exerted, will be described in further detail below.

For the aforementioned purposes, each of the sub-determining devices 12-1, 12-2, . . . , 12-n is connected through data transmission lines DW1 and control lines OV1, OV2, . . . , Ovn to the query device 11. Both the data transmission lines DW1 and the control lines OV1, OV2, . . . , OVn may be constructed either as separate lines or as a bus line.

The sub-determining devices 12-1, 12-2, . . . , 12-n are supplied through the data transmission lines DW1 with the data packets taken over by the query device, being supplied in such a manner that a given sub-determining device will be supplied only with those data packets that originate in the particular sending station associated with it.

The query device 11 receives information, among other information, from the associated sub-determining devices 12-1, 12-2, . . . , 12-n, through the control lines OV1, OV2, . . . , Ovn, as to whether and optionally which of the sending stations are to be left out of consideration by the query device 11 (the determining device is assigned the master function). Other information can also be transmitted over the control lines OV1, OV2, . . . , OVn, in fact bidirectionally if needed, as a function of the events that trip this measure (that is, ignoring sending stations) and of the type of reaction to such events.

The sub-determining devices 12-1, 12-2, . . . , 12-n are also connected over data transmission lines DW2-1, DW2-2, . . . , DW22-n to the multiplexer 13.

The sub-determining devices 12-1, 12-2, . . . , 12-n carry the data packets supplied to them through these data transmission lines DW2-1, DW2-2, . . . , DW22-n on to the multiplexer 13.

The multiplexer outputs the data packets in a predetermined order from the transfer station through data transmission lines DO.

The transfer station described above can always be operated safely, or in other words without any overload occurring in the transfer station, because of the described cooperation of the determining device 12 and the query device 11.

The above-described leaving out or skipping of one or more sending stations by the query device can be tripped by the most various events, in accordance with given needs.

One possible tripping event (a first tripping event) is that an arbitrary one of the sub-determining devices 12-1, 12-2, . . . , 12-n ascertains that a limit value assigned to it (preferably individually) is exceeded or is about to be exceeded or threatens to be exceeded by the quantity of data taken over and/or to be taken over from the associated sending station per unit of time.

The defining of the limit values for the sending stations associated with the various determining devices can be carried out to meet given individual needs.

As a rule, the limit values will each be between the average data quantity to be taken over per unit of time from the applicable sending station and the maximum data quantity taken over per unit of time.

The limit values and the number of sending stations connected to the transfer station will expediently be chosen in such a way that the sum of the limit values for all of the sending stations is substantially equivalent to the maximum data throughput of the transfer station, or less. If one or more of the limit values is far above the average expected data quantity per unit of time for the applicable sending stations, then the sum of the limit values for all of the sending stations can nevertheless still be above the maximum data throughput of the transfer station.

The allocation of the limit values to the various sending stations can also be carried out by priorities. Those sending stations having data which are highly significant are assigned a limit value which in relative terms is closer to the maximum data quantity transmissible per unit of time than those sending stations having data that are of lesser significance.

Alternatively or in addition to the first tripping event described above, one possible further tripping event may be that independently of the first tripping event or simultaneously with it, a limit value which, for instance, may correspond to the total data quantity transferable by the transfer station per unit of time, is about to be exceeded or threatens to be exceeded.

The defining of the sending station or the sending stations which are to be skipped if such an event occurs is as variable as the event itself that trips skipping of a sending station.

In the simplest case, the sending station to be skipped is that station having an associated sub-determining device which has determined the presence of a tripping event.

Instead, the station to be skipped may also be determined in accordance with suitably defined or variable priorities. The sending station or sending stations having data which are of comparatively low significance is or are then skipped first.

The number of sending stations to be skipped can also be made dependent on the extent to which the particular limit value being used is exceeded or threatens to be exceeded.

The provision and cooperation of the query device and the determining device described above in accordance with the invention makes it possible in a simple way to create an individually configurable communications system which is as economical to operate as it is secure.

I claim:

1. In an assembly having sending stations, receiving stations, and a transfer station receiving data from the sending stations intended to be carried further to the receiving stations, the transfer station taking over the data supplied to it and carrying the data directly or indirectly to a particular desired receiving station, the improvement comprising an apparatus for communication between at least one of the sending and receiving stations and the transfer station, comprising:

a determining device for determining a quantity of data taken over and/or to be taken over into the transfer station per unit of time; and a query and data takeover device for continuously querying the sending stations that are not being ignored as a function of a determination result to determine if data packets are available for takeover by the transfer station, and for continuously taking over data from the sending stations that have been queried.

2. The apparatus according to claim 1, wherein the communication from the sending stations to the transfer station is an asynchronous data packet transmission.

3. The apparatus according to claim 1, wherein the transfer station performs an ATM transfer method.

4. The apparatus according to claim 1, wherein said determining device has a multiplicity of sub-determining devices each assigned to a respective one of the sending stations and each separately determining the data quantity taken over and/or to be taken over from the associated sending station per unit of time.

5. The apparatus according to claim 4, wherein said determining device compares the determined data quantities in each case with a limit value fixed for the applicable sending station.

6. The apparatus according to claim 4, wherein said determining device compares a sum of data quantities determined for all of the sending stations with a total limit value fixed for the transfer station.

7. The apparatus according to claim 1, wherein said determining device determines the total data quantity taken over and/or to be taken over by the transfer station from all of the sending stations per unit of time.

8. The apparatus according to claim 7, wherein said determining device compares the determined total data quantity with a total limit value defined for the transfer station.

9. The apparatus according to claim 5, wherein said determining device causes said query and data takeover device to interrupt data takeover if it is found in the comparison that the applicable limit value has been exceeded.

10. The apparatus according to claim 6, wherein said determining device causes said query and data takeover device to interrupt data takeover if it is found in the comparison that the applicable limit value has been exceeded.

11. The apparatus according to claim 8, wherein said determining device causes said query and data takeover device to interrupt data takeover if it is found in the comparison that the applicable limit value has been exceeded.

12. The apparatus according to claim 1, wherein said query and data takeover device determines where the data packets are available for takeover to the transfer station.

13. In a method for communication between at least one of sending and receiving stations and a transfer station, which includes supplying data from the sending stations to the transfer station with an intention to carry the data further to the receiving stations, taking over the received data in the transfer station and carrying the data directly or indirectly to a particular desired receiving station, the improvement which comprises:

determining a quantity of data taken over and/or to be taken over into the transfer station per unit of time; and continuously querying the sending stations that are not being ignored as a function of a determination result to determine if data packets are available for takeover by the transfer station, and continuously taking over data from the sending stations that have been queried.

14. The method according to claim 13, which comprises communicating from the sending stations to the transfer station with an asynchronous data packet transmission.

15. The method according to claim 13, which comprises performing an ATM transfer method in the transfer station.

16. The method according to claim 13, which comprises separately determining the data quantity taken over and/or to be taken over from the associated sending station per unit of time.

17. The method according to claim 16, which comprises comparing each of the determined data quantities with a limit value fixed for the applicable sending station.

18. The method according to claim 16, which comprises comparing a sum of data quantities determined for all of the sending stations with a total limit value fixed for the transfer station.

19. The method according to claim 17, which comprises comparing a sum of data quantities determined for all of the sending stations with a total limit value fixed for the transfer station.

20. The method according to claim 13, which comprises determining a total data quantity taken over and/or to be taken over by the transfer station from all of the sending stations per unit of time.

21. The method according to claim 20, which comprises comparing the total determined data quantity with a total limit value defined for the transfer station.

22. The method according to claim 17, which comprises causing an interruption of the data takeover if it is found that the applicable limit value has been exceeded in the comparisons.

23. The method according to claim 18, which comprises causing an interruption of the data takeover if it is found that the applicable limit value has been exceeded in the comparisons.

24. The method according to claim 19, which comprises causing an interruption of the data takeover if it is found that the applicable limit value has been exceeded in the comparisons.

25. The method according to claim 21, which comprises causing an interruption of the data takeover if it is found that the applicable limit value has been exceeded in the comparisons.

26. The method according to claim 13, which comprises continuously determining where the data packets are available for takeover to the transfer station.

* * * * *